Dec. 26, 1950     W. KNOPP     2,535,740
AUTOMATIC SAFETY AIR VALVE COUPLING
Filed Nov. 17, 1947
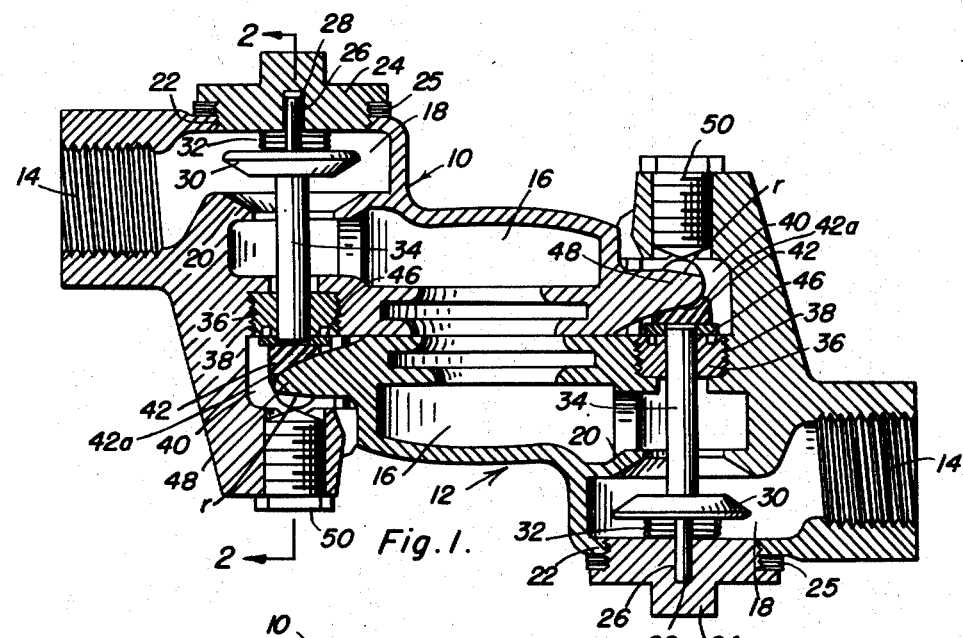
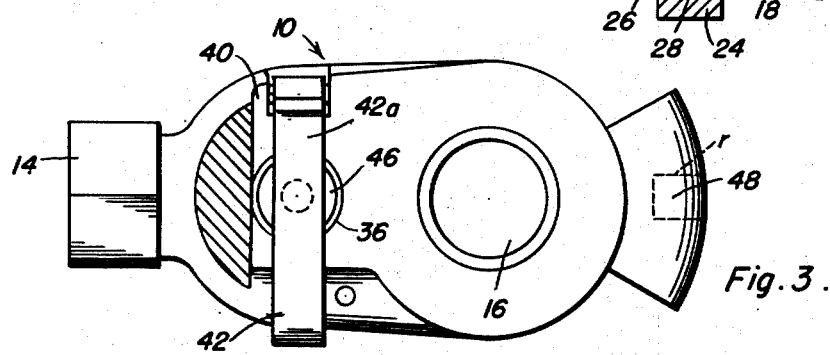
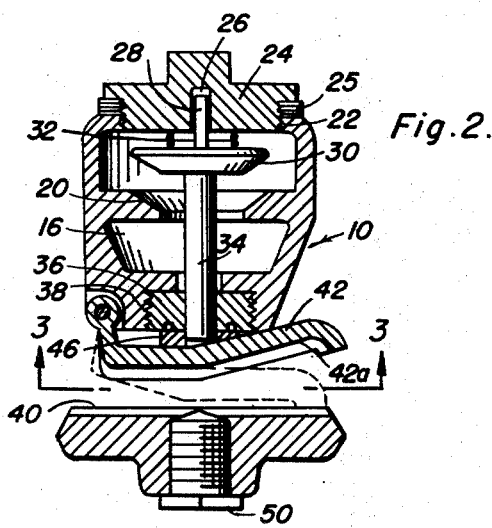
Inventor
William Knopp
By *Clarence A. O'Brien
and Harvey B. Jacobson*
Attorneys Patented Dec. 26, 1950

2,535,740

UNITED STATES PATENT OFFICE 2,535,740

AUTOMATIC SAFETY AIR VALVE COUPLING

William Knopp, Mount Shasta, Calif., assignor of one-half to Knopp Air Coupling Co., a corporation of Oregon Application November 17, 1947, Serial No. 786,432

6 Claims. (Cl. 284—10)

This invention relates to new and useful improvements in couplings and the primary object of the present invention is to provide an automatic safety air valve coupling between cars.

Another important object of the present invention is to provide a pair of companion valve bodies including air control valves mounted therein and novel and improved means for actuating said valves to an open position upon interfitting engagement of said bodies.

A further object of the present invention is to provide an automatic safety air valve coupling embodying novel and improved means whereby the same may be actuated manually for bleeding an air line.

A still further aim of the present invention is to provide an air valve coupling for the air brakes of railway cars and the like that is simple and practical in construction, strong and reliable in use, small and compact in structure, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a longitudinal vertical sectional view taken through the center of the complemental valve bodies of the present coupling, and showing the valves thereof in an open position;

Figure 2 is a transverse vertical sectional view taken substantially on the plane of section line 2—2 of Figure 1; and, Figure 3 is a longitudinal horizontal sectional view taken substantially on the plane of section line 3—3 of Figure 2.

Referring now to the drawings in detail, wherein for the purpose of illustration, there is disclosed a preferred embodiment of the present invention, the numerals 10 and 12 represent a pair of complemental or companion valve bodies generally that form the air valve coupling. Each of these bodies comprises an internally threaded socket or nipple 14 that is applied to the air brake line of a pair of railway cars, trucks or the like (not shown).

These bodies 10 and 12 are provided with opposed, communicating chambers 16, air passages 18 that communicate with the chambers 16 and nipples 14, and valve seats 20 fixed within the bodies between the passages 18 and chambers 16.

Receivably engaging internally threaded openings 22 provided in the bodies 10 and 12, adjacent the passages 18, are closure plugs 24 having annular sealing gaskets 25 and recesses 26 that slidably engage the reduced ends 28 of bevelled valves 30. Coil springs 32 embracing the ends 28, are biased between the plugs 24 and the valves 30 to retain the valves 30 normally seated in the bevelled valve seats 20 and with the valve stems 34 projecting outwardly from sealing washers or plugs 36 that may or may not be employed and which receivably engage internally threaded openings 38 provided in the valve bodies.

Pivoted on the valve bodies for movement in recesses or cut-out portions 40 that communicate with openings 38, are levers 42 that normally remain in a lowered position due to the engagement of the valve stems therewith. Resilient washers 46 are suitably fixed to the plugs 36 by cement or the like and slidably receive the valve stems.

In practical use of the device, one of the valve bodies, for example body 10, is applied to the forward portion of a rear car and the other valve body is applied to the rear portion of a leading car in a reversed manner, as shown in Figure 1. The nipples 14 are respectively connected to the air brake systems of the cars. When the body 10 interfittingly engages the body 12, namely, the arcuate projections or cams 48 of the respective valve bodies are slidably received in the cutouts 40 in the respective valve bodies, as shown in Figure 1, and the projections 48 will force levers 42 against the valve stems 34 and thereby moving the valves 30 out of the valve seats 20 thus automatically turning the air brakes in an "on" position. When the valve bodies are disengaged, the air brakes will be actuated automatically to an "off" position since the springs 32 normally urge the valves 30 to a closed position and into the valve seats 20.

To retain the bodies 10 and 12 in a coupled position, there are provided adjustable fasteners 50 carried by each of the bodies that communicate with cut-outs 40. These fasteners 50 are provided with conical end portions that are received in suitable recesses r provided in the projections 48 or which bear against the projections 48 for locking the projections 48 of the body 10 in the cut-out 40 of the body 12, and the projection 48 of the body 12 in the cut-out 40 of the body 10.

To manually raise the valves to an "on" position, for bleeding the air brakes of the cars, the levers 42 may be actuated to disengage the valves from their seats.

The levers 42 are substantially right-triangular in cross-section and each of the levers includes an elongated sloping surface or cam surface 42a. The cam 48 of the body 10 will ride against the cam surface 42a of the lever 42 pivoted to the body 12 and the cam 48 of the body 10 will ride against the cam surface 42a of the lever 42 pivoted to the body 12 to move the levers 42 against the valve stems 34.

In view of the foregoing description taken in conjunction with the accompanying drawings it is believed that a clear understanding of the construction, operation and advantages of the device will be quite apparent to those skilled in the art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention what is claimed as new is:

1. A safety air valve coupling comprising first and second elongated valve housings, said first valve housing having a first air passage therein and said second valve housing having a second air passage therein in communication with the first air passage, a first vertically slidable valve carried by the first valve housing for controlling the flow of fluid through the first air passage, a second vertically slidable valve carried by the second valve housing for controlling the flow of fluid through the second air pasage, a first lever pivoted to the first valve housing and underlying the first valve, a second lever pivoted to the second valve housing and overlying the second valve, means urging the valves to their closed position, said first lever having a lower cam surface and said second lever having an upper cam surface, an upper cam at one end of the first valve housing, and a lower cam at one of the second valve housing, said upper cam riding against the cam surface of said second lever to force the second lever downwardly thereby urging the second valve to its open position, said first valve being raised to its closed position as the lower cam rides against the lower cam surface of the first lever to urge the first lever upwardly.

2. The combination of claim 1, and a member threaded on each of said housings for retaining said cams against said levers.

3. The combination of claim 1, wherein said cams are disposed laterally of said levers, said levers having end portions projecting laterally from the housings and constituting finger grips.

4. For use in an air coupling, a housing having an air passage, a vertically slidable valve received in the housing for controlling the flow of fluid through the passage, said housing having a cut-out, a lever pivoted to the housing for vertical swinging movement toward and away from the valve and located within the cut-out, guide means carried by the housing slidably receiving the valve, and means carried by the guide means for cushioning swinging movement of the lever toward the valve.

5. The combination of claim 4, wherein said cushioning means includes a resilient washer embracing the valve.

6. For use in an air coupling, a housing having an air passage, a vertically slidable valve received in said housing for controlling the flow of fluid through the passage and including a stem, said housing having a cut-out, a lever pivoted to the housing for movement into and out of contact with the valve stem, said lever being located within the cut-out and including a portion projecting laterally from the housing to permit manual actuation of the lever, said valve including a reduced end remote from the lever, said housing having an opening therein for the removal of the valve from the housing, a closure plug threaded in the opening and having a recess slidably receiving the reduced end of said valve, a spring surrounding the reduced end portion of the valve and biased between the valve and the plug for yieldingly urging the valve to its closed position, and a member threaded on the housing and disposed laterally of said lever and coaxial of said valve stem, said lever being located between the valve stem and the member whereby adjustment of the member in one direction will move the lever into contact with the valve stem.

WILLIAM KNOPP.

REFERENCES CITED

The following references are of record in the file of this patent:

UNITED STATES PATENTS

| Number | Name | Date |
| --- | --- | --- |
| 438,290 | Massey | Oct. 14, 1890 |
| 593,119 | Pugh | Nov. 2, 1897 |
| 686,798 | Balentine | Nov. 19, 1901 |
| 867,280 | Koehler | Oct. 1, 1907 |
| 1,017,442 | Mitchell | Feb. 13, 1912 |
| 1,077,417 | McCracken | Nov. 4, 1913 |
| 1,090,922 | LaFary | Mar. 24, 1914 |
| 2,033,348 | Miller | Mar. 10, 1936 |
| 2,159,906 | Montgomery et al. | May 23, 1939 |